UNITED STATES PATENT OFFICE 2,515,237

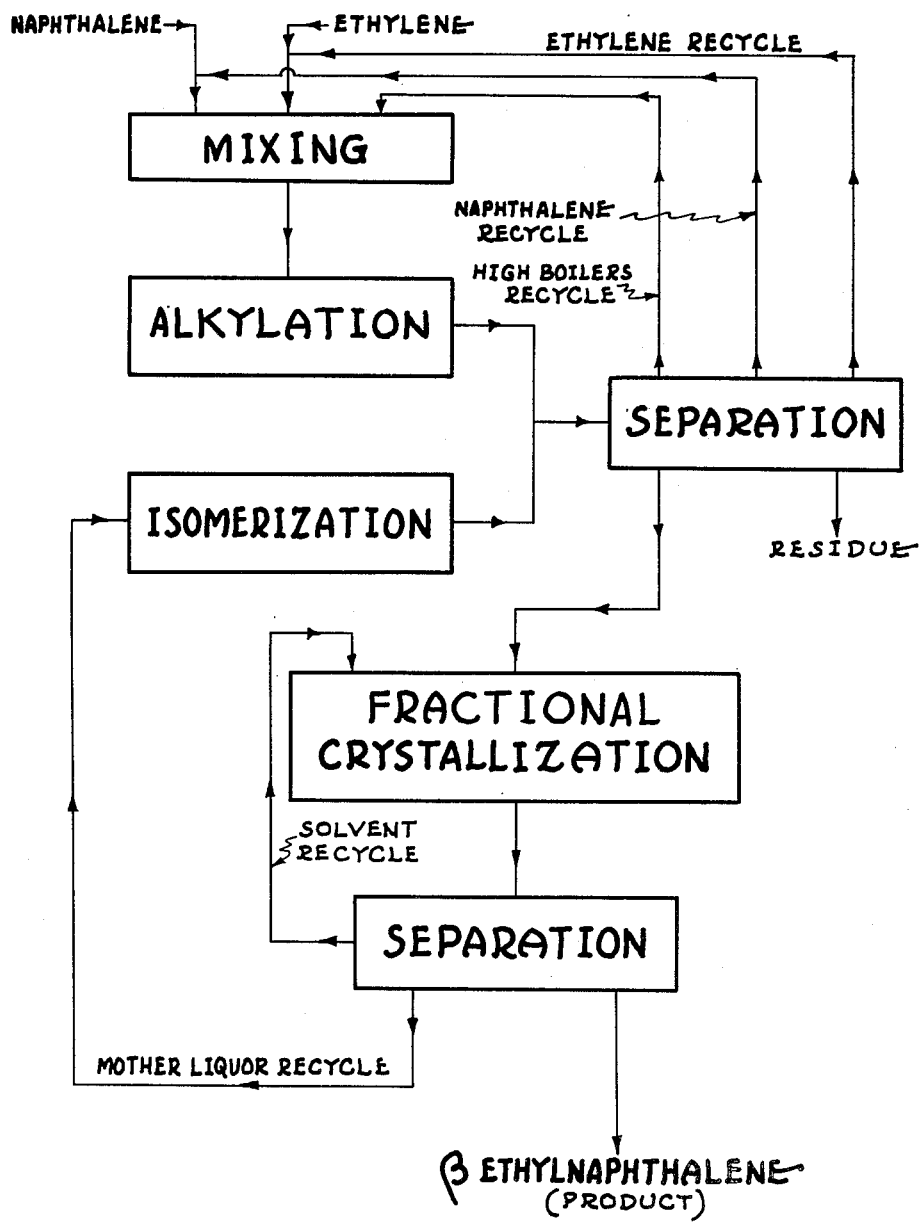

PRODUCTION OF BETA-ETHYL-NAPHTHALENE

Walter M. Kutz, Pittsburgh, Pa., assignor to Koppers Company, Inc., Pittsburgh, Pa., a corporation of Delaware Application July 12, 1947, Serial No. 760,626

8 Claims. (Cl. 260—671)

This invention relates to chemical processes and is particularly directed to improvements in ethylating naphthalene by subjecting a liquid mixture of naphthalene and ethylene to the action of a silica-alumina catalyst at an alkylating temperature above about 275° C. for a time sufficient to produce an alkylate containing at least 3 parts of the beta isomer for each part of the alpha isomer.

It is known that alkylation of naphthalene may be effected with ethylene over activated bleaching earths and like activated clays, U. S. Patent 2,115,884. The known processes, however, while satisfactory where the isomer distribution in the alkylate is immaterial, are not well adapted where a high ratio of beta isomer is desired. Thus, by following the procedure outlined in the above U. S. patent, it is not possible to obtain an alkylate containing more than at most about 1 or 2 parts of beta isomer for each part of alpha isomer.

I have now found that an alkylate containing at least three parts of beta isomer for each part of alpha isomer can be obtained by subjecting a mixture of naphthalene and ethylene to the action of a silica-alumina catalyst at a suitably high temperature. I have found that when the alkylation is effected at relatively low temperatures the isomer distribution tends toward an equal distribution of the two isomers. I have found that increasing the temperature tends to increase the content of the beta isomer and that if the alkylation is carried out in the proper temperature range for the contact time involved, it is possible to obtain as high as 3 or 4 parts of beta isomer for each part of the alpha isomer.

The temperature required to effect this result depends to some extent upon the contact time. Thus, if the reaction is carried out batchwise in an autoclave, a lower temperature will suffice to obtain the desired beta-isomer content. If the alkylation is conducted by a continuous process a somewhat higher temperature may be required in view of the shortened contact time. As a practical matter, I have found that an isomer distribution of between 3 and 4 parts of beta isomer for each part of alpha isomer can readily be obtained at temperatures above about 275° C. especially in batchwise operations. Preferably a somewhat higher temperature, say, in the order of about 300° C. is used in continuous operation. At this temperature I have been able consistently to obtain an isomer distribution of about 4 parts of beta isomer for each part of alpha isomer over a wide range of contact times including a liquid hourly space velocity of 2. It will be understood that longer and shorter contact times may be used and that those skilled in the art, having available the information set forth herein, will readily be able to determine suitable contact time.

My invention is particularly useful in producing beta-ethylnaphthalene. Mixtures of alpha- and beta-ethylnaphthalenes are particularly difficult to separate, and this difficulty becomes more pronounced the closer the composition of the mixture approaches the eutectic composition. The two isomers have such similar boiling points that separation by fractional distillation is virtually impossible. The alternative of fractional crystallization while effective, especially if a solvent such as methanol is utilized to facilitate fractional crystallization, is only available where the mixture differs sufficiently from the eutectic mixture to make fractional crystallization practical. Now, it so happens that the eutectic mixture is very close to the 50/50 mixture (about 56% alpha and about 44% beta). Consequently, when the alkylation is so carried out that the isomer ratio of beta to alpha is not substantially greater than one or two, separation of the beta isomer by fractional crystallization becomes difficult and not very practical. However, where, in accordance with the invention, the alkylation is so carried out that the isomer ratio, beta to alpha, is at least three, and preferably 4, separation of beta isomer by fractional crystallization becomes relatively simple.

My invention, therefore, is of particular utility in connection with the manufacture of beta-ethylnaphthalene by processes as illustrated in the accompanying flow sheet.

Ethylene and naphthalene are mixed along with the various recycled products under a pressure and at a temperature suitable to provide a solution of ethylene in naphthalene in proportions suitable for producing monoethylnaphthalene. The liquid mixture thus obtained is then subjected to alkylation over a silica-alumina catalyst at a temperature above about 275° C. for a time sufficient to produce at least 3 parts of beta-ethylnaphthalene for each part of alpha-ethylnaphthalene. The alkylate thus obtained is subjected to a separation such as, for example, fractional distillation in which unreacted ethylene and naphthalene are taken overhead and returned to the mixing step along with any polyethylnaphthalenes or other high boiling materials suitable for recycling to the alkylation and in which the monoethylnaphthalenes are taken off for further processing. There is thus obtained a mixture of monoethylnaphthalenes containing at least three parts of the beta isomer for each part of the alpha isomer.

From the separation the ethylnaphthalenes are passed on to a fractional crystallization which suitably is effected in the presence of a suitable solvent where on cooling, the beta isomer is crystallized out in a relatively pure form. The resulting slurry is then subjected to a suitable separation in which the beta-ethylnaphthalene is recovered as product, the solvent is recovered for recycle to the fractional crystallization and the mother liquor free of solvent is recycled to the isomerization.

The isomerization is effected by bringing the mixture of alpha and beta isomers obtained as the mother liquor in the crystallization into contact with a suitable isomerization catalyst at a suitably active temperature. The contact may be effected either in the liquid or the vapor phase. The pressure suitably is atmospheric although subatmospheric and superatmospheric pressures may be employed. The temperature required varies according to the particular catalyst and may be determined empirically. Ordinarily a temperature between about 250° C. and about 650° C. will be suitable. With a suitably active catalyst it is possible to obtain an isomate containing 3 or more parts of beta isomer.

Catalysts suitable for carrying out the isomerization include silica and/or alumina as well as other compounds of aluminum such as aluminum halides. The natural and synthetic silica-alumina complexes containing from about 1% to about 95% alumina are particularly effective. With such catalysts it is possible to obtain equilibrium conversions (to about 4 parts beta for each part alpha) by contacting the 50/50 mixture of the two isomers with the catalyst at atmospheric pressure and at a temperature between 400° C. and 500° C. Higher and lower temperatures, however, may be used.

The product of the isomerization, sometimes referred to as isomate, is fractionally distilled or otherwise treated to separate the monoethylnaphthalenes from any naphthalene or other product formed in the isomerization. As illustrated in the flow sheet, it is convenient to combine the alkylate and the isomate and to effect the separation of monoethylnaphthalenes from other products in one operation.

In accordance with a typical procedure, as outlined in the accompanying flow sheet, naphthalene at 90° C. is saturated with ethylene under a pressure of 200 lbs. per square inch. The feed stock thus prepared is then preheated to a temperature of 300° C. and fed upwardly through a catalyst bed charged with a synthetic silica-alumina catalyst containing 1% alumina and 99% silica at a liquid hourly space velocity of 2.5; i. e., at a rate of 2.5 volumes of liquid feed per volume of catalyst per hour. The temperature in the catalyst bed was maintained at 300° C. From the alkylate of a typical run in which 3,360 parts of naphthalene containing 60 parts of ethylene is processed, there is obtained on distillation 164 parts of monoethylnaphthalene analyzing 80% beta-ethylnaphthalene and 20% alpha-ethylnaphthalene. The parts are by weight whenever used unless otherwise specified.

The mixture of monoethylnaphthalenes thus obtained is dissolved in an equal quantity of methanol. This solution is then cooled to a temperature of −40° C. to −45° C. and then seeded with crystals of beta-ethylnaphthalene which causes the beta-ethylnaphthalene to crystallize and quickly settle. This crystalline mixture is then introduced into a centrifuge separator to separate the mother liquor from the beta-ethylnaphthalene. The beta-ethylnaphthalene crystals are then washed with more methanol to obtain a beta-ethylnaphthalene of a high degree of purity; i. e., from 95 to 97%. If a higher degree of purity is desired, the 95 to 97% beta-ethylnaphthalene may be dissolved in an equal quantity of methanol and recrystallized at a temperature from −40 to −50° C. to give substantially pure beta-ethylnaphthalene.

The mother liquor from the above crystallization, after removal of the solvent, will contain approximately equal amounts of the two isomers. Theoretically, it should be possible to obtain or to approach the eutectic mixture which contains about 56% of alpha-ethylnaphthalene and about 44% of beta-ethylnaphthalene. As a practical matter, however, the beta isomer content will ordinarily be somewhat higher than the eutectic. Thus, ordinarily the mother liquor will contain from about 51 to 53% of beta ethylnaphthalene and 49 to 47% of alpha ethylnaphthalene and will have a freezing point in the order of −32° F.

In place of methanol other solvents may be used such as ethanol and isopropanol in like quantities or even smaller amounts of gasoline, toluene or other low freezing non-viscous solvents.

The 50/50 mixture thus obtained is now subjected to isomerization. The liquid mixture is pumped into a suitable reactor where it is vaporized and preheated in the first part of the reactor which is packed with an inert material such as quartz chips and then passed over the catalyst while maintaining a temperature of about 425° C. The feed is passed over the catalyst at a rate equal to one-half volume of liquid ethylnaphthalene per volume of catalyst per hour. The pressure is substantially the atmospheric pressure. The catalyst may be an acid activated sub-bentonite, a synthetic silica-alumina catalyst or other compound of aluminum in a catalytically active form. With an acid activated sub-bentonite there is obtained from 100 parts of mother liquor 98.2 parts of isomate containing 4 parts naphthalene 92.2 parts ethylnaphthalenes and 3.8 polyethylnaphthalenes. The ethylnaphthalenes recovered from this mixture by distillation analysed 81.5% beta-ethylnaphthalene and 18.5% alpha-ethylnaphthalene and are suitable therefore for mixing with the beta-ethylnaphthalenes recovered from the alkylation and treated as described above to recover the beta-ethylnaphthalene.

It will be understood that the temperatures and rates of flow may be varied in the isomerization without departing from the spirit and scope of the invention. The pressure, likewise, may be varied from atmospheric. Suitably the temperature may range from 325 to 525° C., although the higher temperatures in the order of 425° C. are preferred. Contact times ranging from 0.25 to 2.5 volumes of feed per volume of catalyst per hour had been tried and found satisfactory. Lower rates and possibly even higher rates may be utilized.

It will be seen from the foregoing that I have described a new procedure for preparing beta-ethylnaphthalene, the effectiveness of which is largely dependent upon an alkylation process by which it is possible to obtain an alkylate containing at least 3, and preferably 4 or more, parts of beta isomer for each part of alpha isomer. This desideratum is accomplished in accordance with the invention as above described by carrying out the alkylation at a temperature of 275° C. or more for a time sufficient to give the desired beta to alpha ratio in the alkylate. At 275° C., I have obtained by a batch process using either an acid activated sub-bentonite or a catalyst consisting of a silica gel activated with 1% alumina, an alkylate containing a beta to alpha ratio of approximately 3. At 300° C. I have obtained beta to alpha ratios of between 4 and 5 without difficulty. At temperatures lower than 275° C., however, the beta to alpha ratio drops off rapidly, and at 230° C. and under the conditions specified in U. S. Patent 2,115,884 the beta to alpha ratio is 2.1.

It is to be understood that the pressures involved in the alkylation may be varied over a wide range as long as it is above the critical pressure. In other words, the pressure should be high enough to maintain a liquid phase process. A pressure of 500 pounds per square inch has been found suitable, though higher pressures within the limits of the apparatus involved may be used. Lower pressures down to the critical pressure may be used. Ordinarily a pressure between about 100 and about 1000 pounds per square inch gauge will suffice.

The contact time likewise may be varied as long as sufficient time is allowed to give an alkylate having the desired high beta content. In a continuous process a liquid hourly space velocity of 2.5 has been found suitable at 300° C. Higher or lower space velocities may be used, however, particularly at lower or higher temperatures respectively. Ordinarily a liquid hourly space velocity between about 1 and about 4 will suffice.

A temperature of about 300° C. is most suitable for the alkylation. A lower temperature down to 275° C. may be used. Any temperature lower than this does not satisfactorily effect the objects of the invention. Higher temperatures up to 350° C. or more may be used but temperatures above 350° C. tend toward excessive decomposition.

While I have described my invention with reference to particular embodiments thereof, it will be understood that variation may be made therein without departing from the spirit and scope of the invention as set forth herein and in the appended claims.

I claim:

1. In a process for the manufacture by the alkylation of naphthalene with ethylene of a mixture of mono-ethylnaphthalenes containing a high ratio of beta-ethylnaphthalene to alpha-ethylnaphthalene the steps of heating a mixture of liquid naphthalene and ethylene in contact with a silica-alumina catalyst at an alkylating temperature above 275° C. until an alkylate containing at least 3 parts of beta isomer for each part of alpha isomer is obtained.

2. The process of claim 1 in which the alkylation temperature is about 300° C. whereby an alkylate containing an alpha- and beta-ethylnaphthalene substantially in the equilibrium proportions of about 4 parts beta isomer for each part alpha isomer is obtained.

3. In a process for the manufacture by the alkylation of naphthalene with ethylene of mono-ethylnaphthalenes containing a high ratio of beta-ethylnaphthalene to alpha-ethylnaphthalene the steps of continuously passing a mixture of liquid naphthalene and ethylene in the proportions of between 2 and 10 mols of naphthalene for each mol of ethylene in contact with a silica-alumina catalyst at a temperature between 275° C. and 350° C. at a liquid hourly spaced velocity between 1 and 4 and at a pressure between about 100 and 1000 lbs. per square inch whereby an alkylate containing at least 3 parts of beta-ethylnaphthalene for each part of alpha-ethylnaphthalene is obtained.

4. The process of claim 3 in which the temperature is about 300° C. whereby substantially equilibrium conversion is obtained.

5. A process for producing beta-ethylnaphthalene which comprises the steps of heating a mixture of liquid naphthalene and ethylene in contact with a silica-alumina catalyst at an alkylating temperature of at least 275° C. until an alkylate containing mono-ethylnaphthalenes in the ratio of at least 3 parts of beta isomer for each part of alpha isomer is obtained, subjecting the alkylate to distillation and recovering thereby a mono-ethylnaphthalene fraction in the aforesaid ratio, crystallizing and recovering from said fraction as product a part of the beta-ethylnaphthalene contained therein thereby leaving a mono-ethylnaphthalene residue containing a ratio of beta to alpha isomer substantially less than the ratio of beta to alpha isomer in said fraction, heating the mono-ethylnaphthalene residue in contact with an isomerizing catalyst at an isomerizing temperature to produce an isomate having an increased beta to alpha isomer ratio, comingling the isomate with the alkylate whereby the isomate is subjected to the same processing as the alkylate and substantially all of the alpha-ethylnaphthalene is converted to beta-ethylnaphthalene.

6. The process of claim 5 in which the alkylation temperature is about 300° C. whereby an alkylate containing a substantially equilibrium mixture of alpha- and beta-ethylnaphthalene is obtained.

7. A process for producing beta-ethynaphthalene which comprises the steps of continuously passing a mixture of liquid naphthalene and ethylene in the proportions of between 2 and 10 mols of naphthalene for each mol of ethylene in contact with a silica-alumina catalyst at a temperature between 275° C. and 350° C. at a liquid hourly spaced velocity between 1 and 4 and at a pressure between about 100 and 1000 lbs. per square inch whereby an alkylate containing at least 3 parts of beta-ethylnaphthalene for each part of alpha-ethylnaphthalene is obtained, subjecting the alkylate to distillation and recovering thereby a mono-ethylnaphthalene fraction in the aforesaid ratio, crystallizing and recovering from said fraction as product a part of the beta-ethylnaphthalene contained therein thereby leaving a mono-ethylnaphthalene residue containing a ration of beta to alpha isomer in said fraction, heating the mono-ethylnaphthalene residue in contact with an isomerizing catalyst at an isomerizing temperature to produce an isomate having an increased beta to alpha isomer ratio, comingling the isomate with the alkylate whereby the isomate is subjected to the same processing as the alkylate and substantially all of the alpha-ethylnaphthalene is converted to beta-ethylnaphthalene.

8. The process of claim 7 in which the alkylation temperature is about 300° C. whereby an alkylate containing an alpha- and beta-ethylnaphthalene substantially in the equilibrium proportions of about 4 parts beta isomer for each part alpha isomer is obtained and the amount of recycled mono-ethylnaphthalene is at a minimum.

WALTER M. KUTZ.

REFERENCES CITED

The following references are of record in the file of this patent:

UNITED STATES PATENTS

| Number | Name | Date |
|---|---|---|
| 1,741,472 | Michel | Dec. 31, 1929 |
| 2,115,884 | Schollkopf | May 3, 1938 |
| 2,410,111 | Thomas et al. | Oct. 29, 1946 |
| 2,428,102 | Swietoslawski | Sept. 10, 1947 |

OTHER REFERENCES

Mayer et al., Berichte, 67-B, 67-69 (1934), 3 pages.